United States Patent [19]

Peris

[11] 4,413,939
[45] Nov. 8, 1983

[54] BAR STOCK FEEDER

[75] Inventor: John M. Peris, Elmira, N.Y.

[73] Assignee: Hardinge Brothers, Inc., Elmira, N.Y.

[21] Appl. No.: 287,557

[22] Filed: Jul. 28, 1981

[51] Int. Cl.³ .......................................... B65H 5/16
[52] U.S. Cl. ..................................... 414/17; 248/639; 198/747; 82/2.5
[58] Field of Search ................................. 414/15–17; 248/639, 651, 656, 657; 198/717, 736, 747; 82/2.5

[56] References Cited

U.S. PATENT DOCUMENTS

| 1,768,646 | 7/1930 | Wallace et al. | 248/639 |
|---|---|---|---|
| 2,272,720 | 2/1942 | Mariotte | 414/17 |
| 2,300,457 | 11/1942 | Mariotte | 414/17 |
| 2,327,916 | 8/1943 | Mariotte | 414/17 |
| 2,339,712 | 1/1944 | Mariotte | 414/17 |
| 2,447,180 | 8/1948 | Horrigan | 414/17 |
| 2,577,203 | 12/1951 | Mariotte | 414/17 |
| 2,892,243 | 6/1959 | Lamphere | 414/17 |
| 2,902,178 | 9/1959 | Kramer | 414/17 |
| 3,074,556 | 1/1963 | MacBlane, Sr. | 414/17 |
| 3,074,566 | 1/1963 | MacBlane | 414/17 |
| 3,557,971 | 1/1971 | Tomiyama | 414/17 |
| 3,820,668 | 6/1974 | Hesslein | 414/17 |
| 3,924,494 | 12/1975 | Azuma | 414/15 |
| 3,937,331 | 2/1976 | Spercel | 226/162 |
| 4,129,220 | 12/1978 | Peterson et al. | 414/17 |

Primary Examiner—Robert J. Spar
Assistant Examiner—Terrance L. Siemens
Attorney, Agent, or Firm—Shlesinger, Arkwright, Garvey & Fado

[57] ABSTRACT

A bar stock feeder has both horizontal and vertical adjustment of the carrier standards and a quick acting locking and pneumatic connecting assembly for engaging the bar stock tube assembly which is supported and aligned on the standard by a retainer assembly.

15 Claims, 7 Drawing Figures

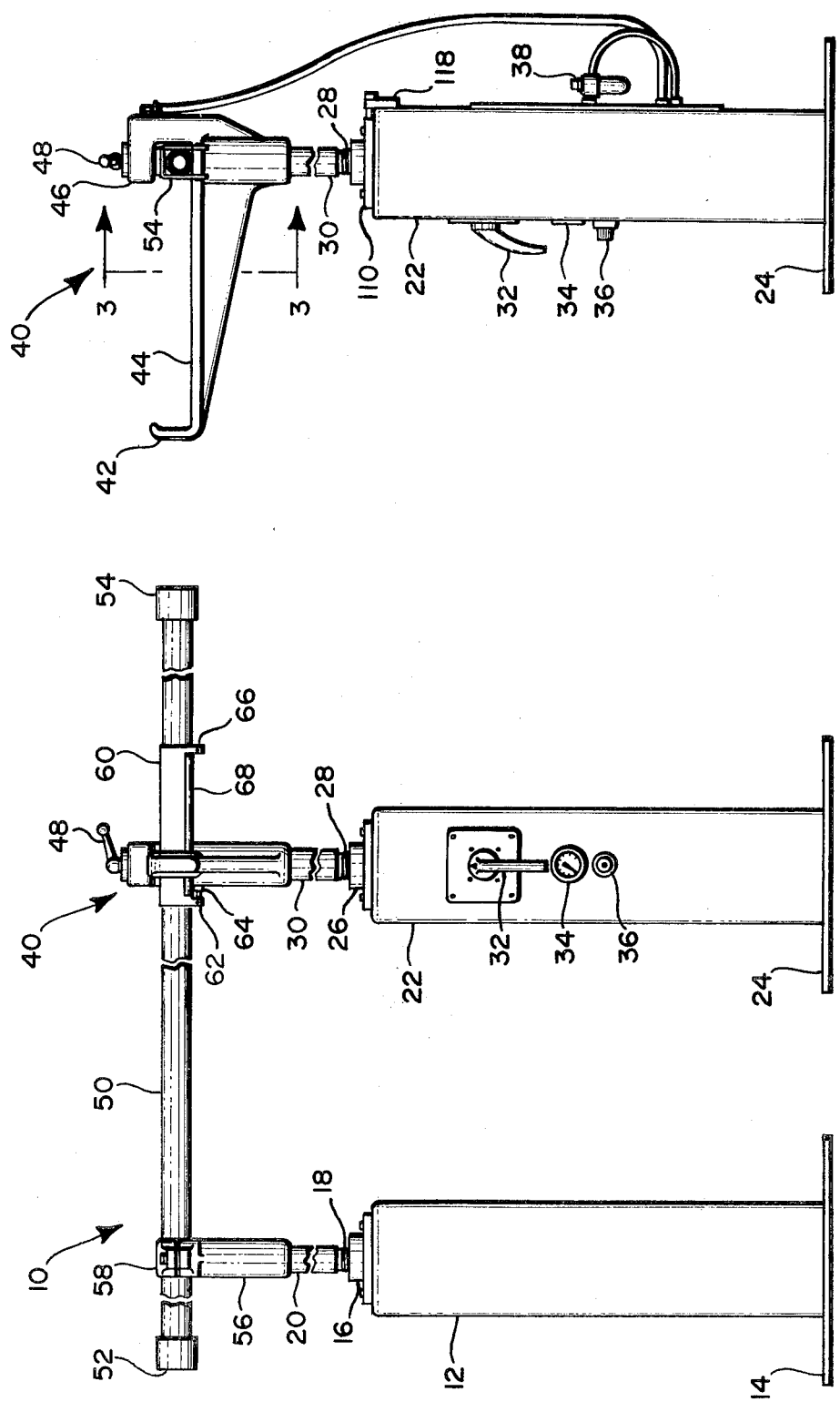

BAR STOCK FEEDER

BACKGROUND OF THE INVENTION

This invention relates to bar stock feeders for machine tools, and particularly to a bar stock feeding assembly in which the bar stock is pneumatically advanced toward the machine tool.

The type of feeder to which this invention relates is shown in the patents to McBlane, Sr., U.S. Pat. No. 3,074,566, and Peterson, U.S. Pat. No. 4,129,220, owned by the assignee of this application.

These and many other similar types of devices provide for safety cut-off of pneumatic air supply, and for some type of adjustment of the bar feed tube with the machine tool to which the bar stock is to be fed.

However, these prior type of units require a substantial amount of set-up time to provide for accurate alignment with the machine tool. Continual adjustment of position and repositioning of the units has been required before the assemblies could be placed in operation, inasmuch as the bar stock feeder tube axis must be very accurately aligned with the axis of the lathe or other type of machine tool to reduce vibration and noise between the rotating parts of the bar tube feed assembly.

There is a need for a convenient and readily operable bar feeder unit in which the operator can readily position the feed tube with extreme precision by means of relatively few manual movements and a single acting lock and pneumatic supply connection which precludes manual override of the safety valve structure.

SUMMARY AND FEATURES OF THE INVENTION

Accordingly, this invention is directed to providing an improved type of bar stock feeder unit of the above type for machine tools in which the shortcomings of prior designs are overcome.

It is a feature of this invention to provide a bar stock feeder which is capable of being rapidly aligned with the machine tool for which it is to supply bar stock material.

It is a still further feature of this invention to provide a bar stock feeder unit which has an accurate positioning capability in both the horizontal and vertical directions to permit the units themselves to be fastened in position and supplemental alignment to be made after such fastening.

It is still another feature of this invention to provide a simplified bar stock feeding assembly which simultaneously locks the bar feeder tube assembly in alignment with the machine tool and also provides a quick connect-disconnect capability tor the pneumatic supply line to the unit.

It is still further feature of this invention to provide a bar stock feeder unit which has the capability for permitting the operator to rapidly position the bar stock feeder tube in accurate direct alignment with the machine tool with which it is being used.

It is a still further object of this invention to provide a bar stock feeder unit in which the bar stock tube can be very accurately positioned on the desired feed axis to preclude excessive vibration and noise of the feeder assemnbly when the machine tool is in operation.

It is still further feature of this invention to provide a readily operable pneumatic circuit for the operation of the bar stock feeder assembly with a safety pneumatic cut-off in the supply line. This cannot be manually overridden by the operator since there will be a discontinuity in the supply line when the feeder tube is not aligned with the machine tool.

It is still a further feature of this invention to provide a bar stock feeder unit in which the operator has a convenient readily operable single movement clamp air supply lever which connects to the bar tube feeder.

It is a still further feature of this invention to permit the bar stock to be loaded with a new length of bar stock and then rapidly swung into position against an ajustable member which gives a very accurate alignment of the stock with the machine tool.

These and further features of this invention will become apparent from the following description and drawings.

DESCRIPTION OF THE DRAWINGS

FIG. 1 is a plan view of the bar stock feeder of this invention.

FIG. 2 is an end view of the bar stock feeder assembly.

DESCRIPTION OF THE INVENTION

Figure 3:
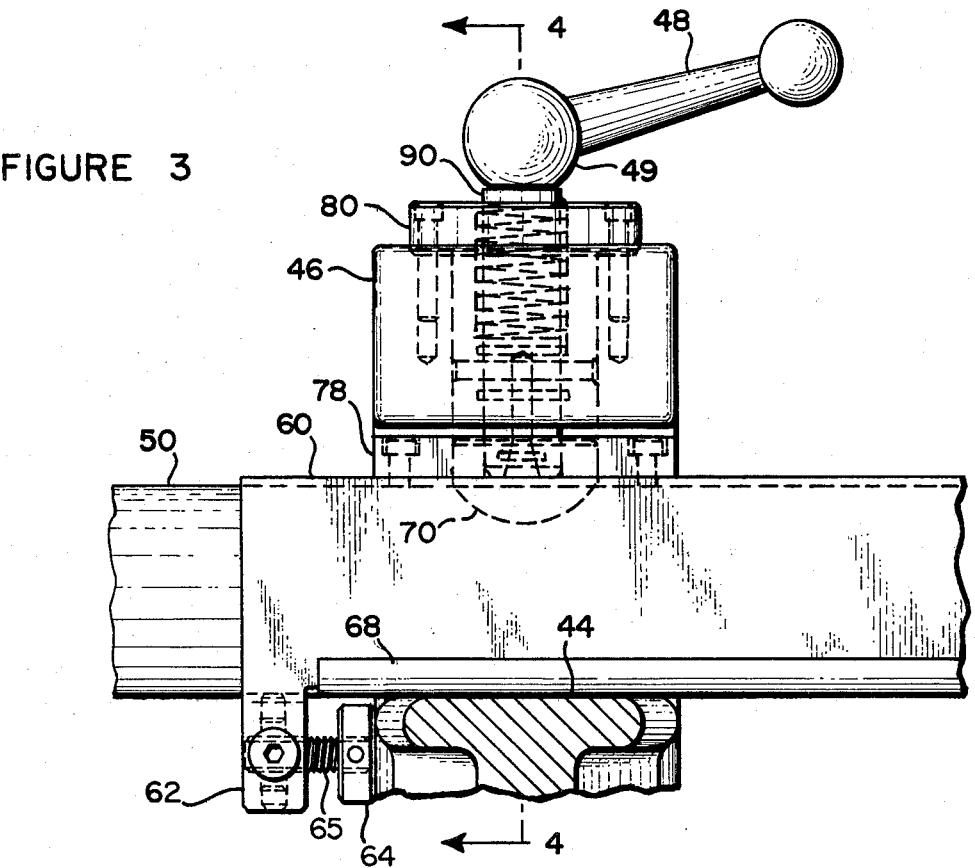
FIG. 3 is an enlarged sectional view taken along line 3—3 of FIG. 2.

Referring to FIGS. 1 and 2, the bar stock feeder assembly is generally shown at 10. The rear pedestal base 12 forms a support and has a rectangular base plate 14 which rests on the floor and is normally bolted into position for stability. At the upper end of the pedestal base a locknut collar 16 on a support plate receives the lower threaded end 18 of the vertical adjusting post 20.

The front pedestal base 22 similarly has a rectangular base plate 24 and a height locking nut 26. It receives the reduced diameter threaded end 28 of the vertical adjusting post 30.

The front pedestal base 22 also includes a fluid control circuit for the unit and has a three position hand valve 32, a gauge 34, and an air pressure regulator 36 all disposed on the front panel of the pedestal base 22. The rear panel has the fluid supply lines and the filter 38 extending therefrom.

The bar stock front carrier standard generally indicated at 40 has an end barcket 42 extending outwardly which has an upper horizontal bar feed tube flat supporting surface 44. The adjacent section of the bar stock carrier standard 40 has an upwardly extending generally C-shaped upper bracket member 46 which extends up and over the horizontal flat surface 44 of the end bracket 42, allowing sufficient space to receive the bar stock tube assembly. The locking handle 48 is disposed at the top of the upper bracket member 46.

The bar feed tube assembly has an outer elongated cylindrical tube 50 which is closed with rear end cap 52 and has an open end section through which the bar stock is fed. It is closed by removable front end cap 54 which is mounted on inner cylindrical tube 55 (shown in FIG. 4) with a slight diametrical clearance from the inner diameter of outer tube 50 to provide an annular air channel between the tubes through which compressed air is passed to the rear of the tubes and to the rear of the plunger assmbly. The plunger assembly is similar to that of U.S. Pat. No. 4,129,220 and is mounted within the inner tube.

The rear carrier standard lower section 56 supports the rear section of the outer bar stock tube 50 which is clamped in locked position by the upper element of bar tube clamp 58.

The outer bar tube 50 is supported at its forward section on the flat horizontal tube supporting surface 44 of the bar stock standard 40 by a three-sided square U-shaped retainer piece 60 which has a rear depending adjustable stop bracket 62 which supports a laterally adjustable pad member 64. The pad 64 engages the side of the standard and is supported by adjustable screw 65.

The forward end of the retainer 60 has a rotatable tube supporting wheel 66. The intermediate flat surface engaging portion of the retainer 60 has a flat surface engaging wear strip 68 on each periphery, as shown in FIG. 4. The retainer has a block 78 fastened to it, and since the block fits around feeder seat 70, pad member 64 as seen in FIG. 3, will position the feeder seat 70 under the plunger 90.

Figure 4:
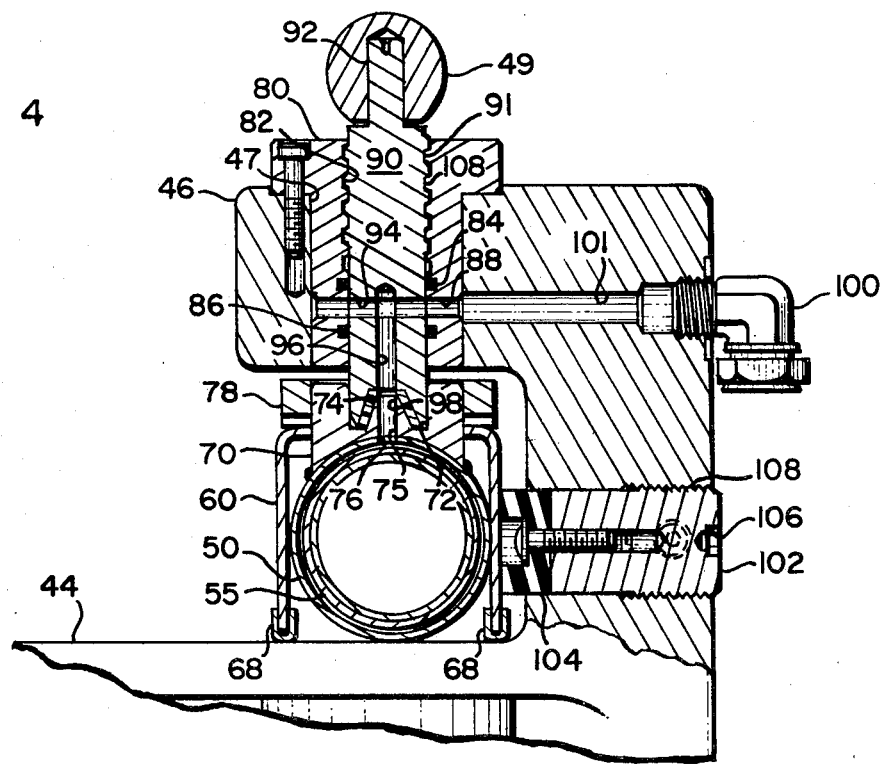
FIG. 4 is a sectional view along line 4—4 of FIG. 3.

The details of the pneumatic feed supply and bar stock feeder tube lock mechanism is shown in FIGS. 3 and 4. In FIG. 4, the feeder seat 70 is shown disposed on the outer surface of the bar stock outer tube 50. It has a circular recess 72 and an upstanding conical plunger engaging section 74. Engaging section 74 has a central pneumatic passage 75 extending therethrough and in registry with an opening 76 through the surface of the outer tube 50. This allows the working fluid, such as compressed air to reach the annular space between the inner surface of the outer tube and the outer surface of the inner bar stock engaging tube 55 along which it travels to a port at the rear of the inner tube 55.

The valve seat 70 is preferably welded into position on the outer bar stock feed tube 50 to maintain the passages 75 and 76 in registry and to preclude escape of work fluid when the bar stock feeder is in operation. Similarly, the valve seat extends through the upper wall of the retainer 60 and is held in position by the valve seat retaining block 78 which is held in position on the retainer 60 by a plurality of metal screws.

The engaging assembly for the feeder seat piece 70 is disposed immediately above it and includes the plunger retaining nut 80 which is held in position by a plurality of retaining screws and has a reduced lower section which fits into a circular opening 47 of the upper bracket piece. It has a central bore 82 containing O-rings 84 and 86 which are disposed adjacent a through passageway 88.

A cylindrical plunger 90 has an external spiral groove 91 which engages similar grooves on the inner surface 82 of the plunger retaining nut 80. It has an upper stem 92 which is received in the lower knob 49 of manual handle 48 and turns therewith. The plunger has a through passage 94 positioned to come into registry with the through passage 88. The plunger is in its lowermost position seated on the feeder seat piece 70.

The central passageway conduit 96 extends downwardly from the cross passage 94 and flows outwardly at its lower end. It receives a plastic liner 98 having an outwardly flared conical inclined surface which matches the conical surface 74 of the feeder seat 70. When the lower end of the plunger 90 is brought down into engagement with the conical surface 74, a complete fluid passage from the outer surface of tube 55 is made to the outer periphery of the plunger retaining nut 80 through opening 76, central passageway 75, central passage 96, cross passage 94, and passageway 88.

Pneumatic pressure is supplied from the flexible hose and through the fitting 100 to the passageway 101 through the upper bracket piece 46. Passageway 101 is in direct alignment with the fixed passage 88 of the plunger retaining nut 80. The retainer is held into position so that the valve seat 70 and the plunger 90 are in general alignment by the plunger assembly 102 which has a rubber bumper 104. A bumber engages the inner side of the bar tube retainer unit 60 to hold it in direct alignment. It has an external socket 106 to receive a wrench. Lateral adjustment of the assembly is provided by the external threaded section 108.

Figure 5:
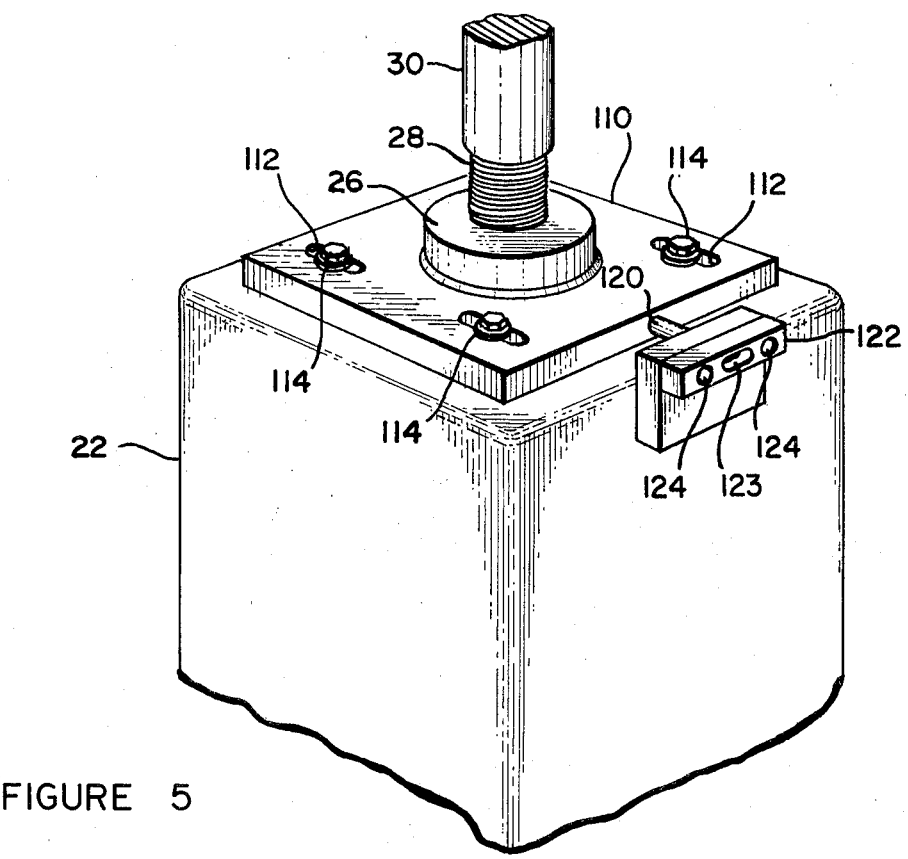
FIG. 5 is an enlarged perspective view of the area of the pedestal base of FIG. 1 from the rear thereof.
Figure 6:
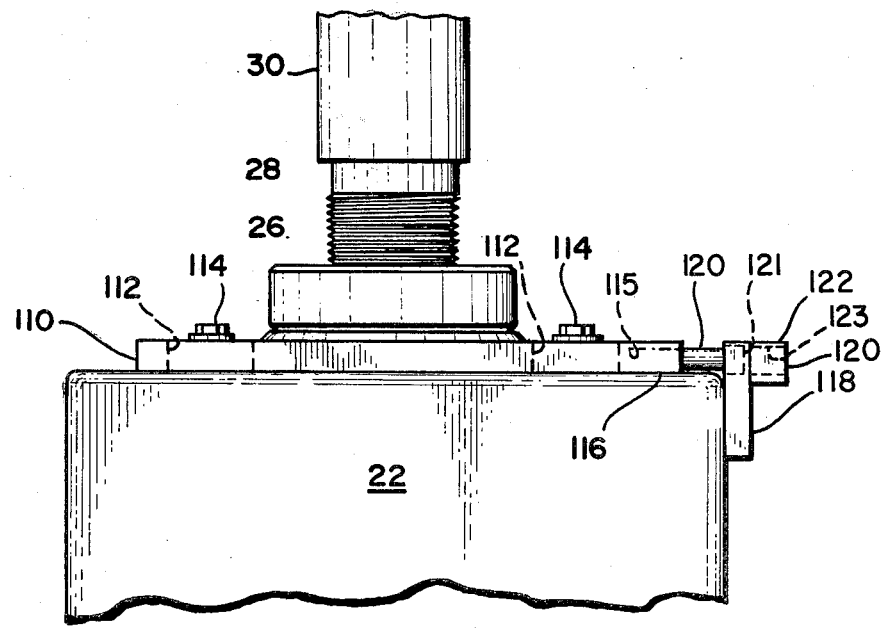
FIG. 6 is a side view of the pedestal base area shown in FIG. 5.

A horizontal adjusting plate assembly is mounted on the top of the base pedestals 12 and 22. FIGS. 5 and 6 show the adjusting plate assembly mounted on the forward base pedestal 22. This is the same as the assembly mounted on base pedestal 12. It has a flat top slide plate 110 and an internally threaded support sleeve which extends downwardly into the pedestal and has lateral internal clearance from the pedestal structure. The support sleeve has an upper circumferential flange 111 which rests on and is in fixed engagement with the top surface of the top slide plate 110. The adjusting post 30 is rotatably received in a socket in the bottom of the front carrier assembly 40 and held in position by a locking screw.

Horizontal adjusting of the carrier standard is made possible by the horizontal movement of the top plate assembly inasmuch as the flat slide plate 110 is horizontally movable. It has four elongated slots 112. A locking bolt 114 is positioned in each slot and is threadedly engaged in the top of the pedestal. The bolts 114 are loosened and the plate can then be moved horizontally along the length of the slot. Any intermediate position can be selected and the bolts subsequently tightened to hold the plate 110 in position.

An adjusting block assembly provides for lateral adjustment of the top slide plate.

FIGS. 5 and 6 show the horizontal adjusting plate assembly mounted on top of the base pedestals 12 and 22.

Referring to forward base pedestal 22, the flat slide plate 110 contains four elongated slots 112, and is held in position by locking screws 114. The horizontal movement of the upright support 30 is brought about by lateral movement of the slide plate through which it is threaded. The plate 110 has an elongated threaded passageway 115. A rear bracket plate 118 is mounted on the rear face of the base pedestal 22 and has an adjusting screw 120 with its head 121 countersunk within the outer face of the block 118, and its threaded shank extending therethrough to the threaded passageway 116. The adjusting screw 120 has a recessed hexagonal socket in its head and is held in the bracket plate by a locking block 122. This block has an elongated opening 123 large enough to permit passage of the hexagonal pin wrench, but too small to permit the head 121 to enter.

Therefore, on rotation of the adjusting screw with the hexagonal pin wrench, the adjusting bolck 110 moves forward or away from the rear bracket plate 118 depending upon the direction it is turned.

Figure 7:
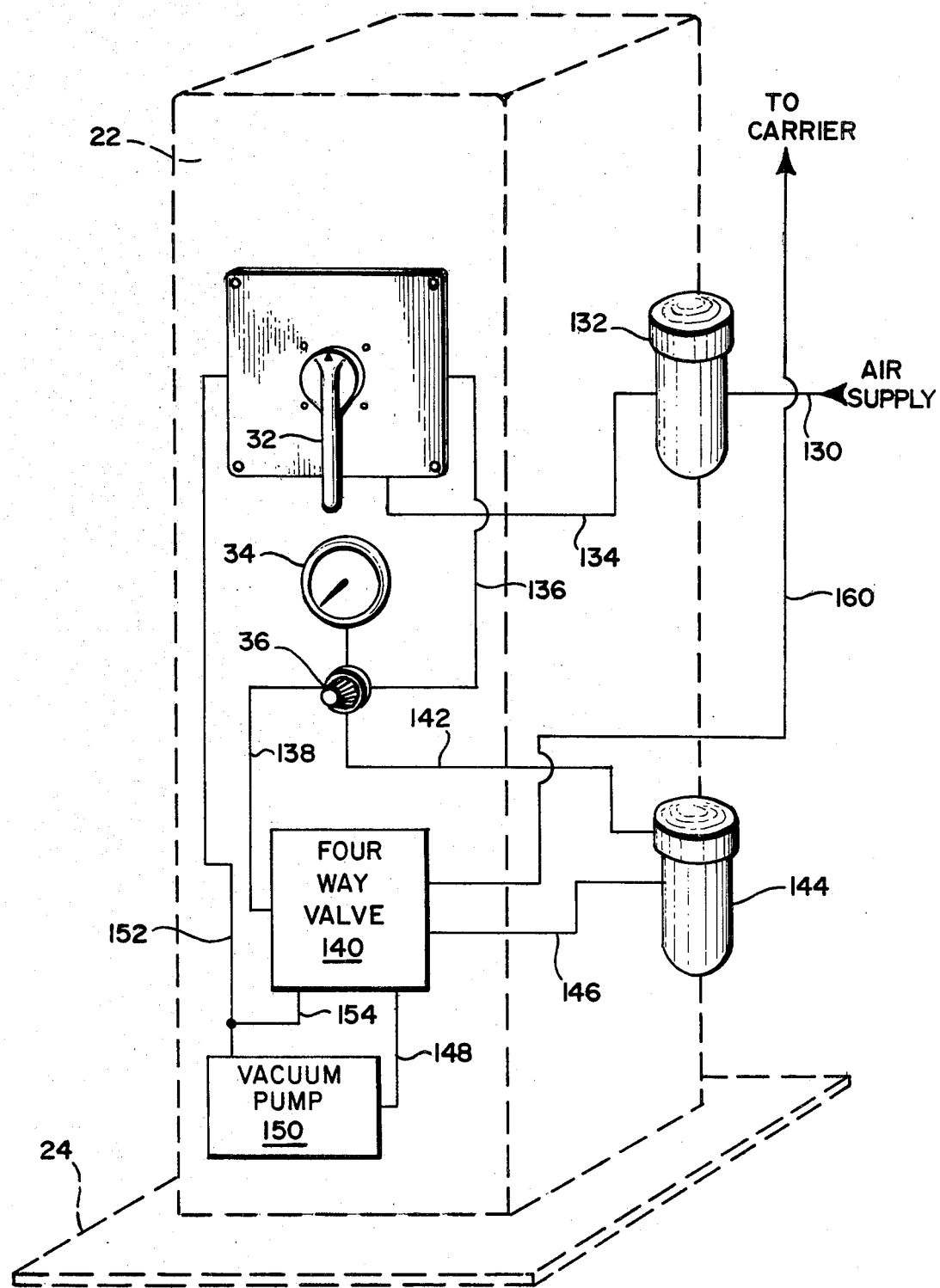
FIG. 7 is a diagrammatic view of the pneumatic circuit generally as arranged within the pedestal base.

Referring to FIG. 7, the penumatic supply circuit is shown as generally arranged within the forward pedestal base 22 which is shown in dotted outline. The air supply is brought to the unit by line 130 and passes through the filter 132 and along line 134 to the three-way valve 32. Line 136 carries the air supply from the valve through the air pressure regulator 36 and along line 138 to the fourway valve 140. The gauge 134 is connected along line 142 to the air line lubricator 144, which provides oil mist lubrication with line 142 being tee connected to the regulator. The lubricator 144 is connected by the line 146 to the four-way valve 140. Line 148 connects the four-way valve 140 to the vacuum pump 150, which in turn is connected to the three-position hand valve 32 along line 152. The four-way valve 140 has a key connection line 154 to line 152. Pressure is supplied from the four-way valve through air supply line 160 and the carrier standard 46.

OPERATION

Referring to FIG. 1, the first step in setting up the bar feed assembly is to align the base pedestals 12 and 22 with the machine tool and then to fasten down the base plates 14 and 24. Accurate alignment of the bar feed tube assembly is then accomplished by turning the vertical adjusting posts 20 and 30 on the rear and front carrier assemblies to allow for the correct vertical height and then tightening locking nuts 16 and 26. Lateral adjustment is then made by turning the adjusting screw 120 on the horizontal adjusting block of the forward carrier base pedestal 22, located at the rear thereof, as described with reference to FIG. 5. A similar type of assembly mounted at the top of the base pedestal 12 then permits lateral adjustment of the rear carrier 56 also.

With these adjustments it is possible to firmly support the base pedestals and then to subsequently very accurately align the center line of the feeder tube 50 in both the horizontal and vertical directions. It has been found that this arrangement makes it possible to substantially reduce the time required to obtain the necessary alignment of the bar tube assembly with the machine tool. Simple turning of the vertical adjusting posts 20 and 30 and of the horizontal adjusting screw 120 permits the operator to very rapidly and accurately position the tube along the desired center line.

Once the carrier standards are adjusted, the horizontal feeder tube support surface 44 of the carriers are fixed and the changes of bar stock in the feeder tube assembly is reaadily accomplished. The feeder tube assembly is supported by the retainer assembly 60 which keeps it from rolling and maintains the feeder tube assembly in alignment. The wear strips 68 engage the flat horizontal surface 44 to maintain the feeder seat 70 in an upright position.

Positioning of the retainer so that the plunger and valve seat assembly line up and accurately come together is also an important consideration. Relative positioning of the two members along the horizontal axis of the feed tube is accurately controlled by the adjusting pad 64 which is supported by the depending bracket 62 of the retainer assembly 60 as shown in FIG. 3. Adjustment is made by turning the threaded screw member 65.

The lateral positioning of the retainer for lateral seating alignment is determined by the adjusting nut assembly 102. The turning of this threaded piece shown in FIG. 4 will press against the side all of the retainer 60 to move the retainer laterally to the desired position.

The adjustment for accurate seating of the plunger and seating valve is thus accurately brought about by accurately positioning the retainer with the longitudinal and lateral adjusting assemblies. It should be noted that both assemblies provide for a stop type of engagment and positioning and that the retainer is not locked into position until the plunger is seated in the feeder seat.

As can be seen from FIGS. 3 and 4, as the operator turns the handle 98, the spiral threaded plunger 90 will descend downwardly, and its lower tapered plastic sealing insert section 98 will come into direct and sealing engagement with the upstanding conical seating member 74, giving an air tight seal. This locked position is shown in section in FIG. 4.

The air supply is brought to standard upright section 46 through the fitting 100 and passageway 101. Passageway 101 is aligned with the passageway 88 in the plunger nut 80. It, in turn, is aligned with cross passageway 94 of the plunger 90 which is then in registry with it. The central passageway 96 will bring the air supply from the plunger cross passage 94 down to the central conduit 75 of the feeder seat where it passes through the opening 76 in the outer tube 50. The compressed air supply then proceeds between the outer tube 50 and the inner tube 55 to the rear of the bar feeder tube assembly where it is supplied to the internal plunger assembly, which is not shown.

For the operator to insert a new length of bar stock for feeding to the machine tool, it is merely necessary for him to turn three-way valve 32 to the retract position and then to the off position. He then frees the bar feeder tube 50 by turning the handle 48 to raise the plunger. Once the plunger is raised, the bar feed tube assembly can be freely moved outwardly and clear of the machine tool along the horizontal surface 44. Once the new length of bar stock has been inserted into the feeder tube assembly, it is merely necessary to swing the retainer 60 back into position against the bumper 104 of the adjusting assembly 102 and press the pad 64 up against the side of the carrier as shown in FIG. 3. The feeder tube assembly then is locked into postion by again turning the handle 48 to bring the plunger 90 downwardly and into locking and seating engagement with the feeder seat 70. Pneumatic pressur is then restored to the unit by turning the three-way handle 32 to the on position.

While this invention has been described, it will be understood that it is capable of further modification, uses and/or adaptations of the invention following in general, the principle of the invention and including such departures from the present disclosure as come within known or customary practice in the art which the invention pertains, and as may be applied to the essential features hereinbefore set forth, as fall within the scope of the invention or the limits of the appended claims.

What is claim is:

1. A bar stock feeder assembly for use with a machine tool, comprising:
   a. a bar stock feed tube assembly including an inner tube and a slightly larger outer concentric therewith,
   b. a pneumatically operative plunger assembly disposed within the inner tube for engaging bar stock and moving said bar stock toward the machine tool,
   c. a support standard assembly for supporting the feed tube assembly horizontally and in alignment with the machine tool,
   d. the support standard assembly including a lower support, e. a vertical standard extending upwardly from the lower support and having a horizontally extending carrier member, f. the carrier member having a horizontal feed tube supporting surface and an upright bar tube section which extends over and clear of the horizontal bar supporting surface, g. the bar tube retaining section having an operable locking assembly and including an integral spiral threaded plunger which moves downwardly toward the horizontal feed tube supporting surface, h. the bar stock feed tube assembly having an upwardly extending locking and feeder seat engaging means which is axially aligned with said spiral threaded plunger for engaging said spiral threaded plunger when the feed tube assembly is aligned with the machine tool, and which has a central receiving conduit, and i. the spiral threaded plunger having a central supply conduit which is moved into direct communication with the feeder receiving conduit when the spiral threaded plunger is lowered into locking engagement with the feeder seat.

2. The bar stock feeder assembly for use with a machine tool as set forth in claim 1, wherein:
(a) the locking assembly includes a manually operable handle directly attached to the upper end of the speral threaded plunger.

3. The bar stock feeder assembly for use with a machine tool as set forth in claim 1, wherein:
(a) the upright feed tube assembly retaining section contains a line supply conduit, and
(b) the spiral threaded plunger central supply conduit simultaneously connects the line supply conduit and the central receiving conduit of the feeder seat.

4. The bar stock feeder assembly for use with a machine tool as set forth in claim 3, wherein:
(a) the support standard lower support is a hollow pedestal base containing a pneumatic control circuit, and
(b) a pneumatic connecting line connects the control circuit in the pedestal base to the line supply conduit of the upright feed tube assembly retaining section of the carrier member.

5. The bar stock feeder assembly for use with a machine tool as set forth in claim 1, wherein:
(a) the feeder seat has a recess with an upstanding central tapering conical section containing the receivinhg conduit, and
(b) the spirial threaded plunger has a matching outwardly flared section at the end of its central supply conduit which engages the conical section of the feeder seat.

6. The bar stock feeder assembly for use with a machine tool as set forth in claim 1, wherein:
(a) the bar stock feeder tube assembly includes retainer means for keeping the bar stock feed tube assembly in position on the horizontal feed tube supporting surface and supporting the feeder seat position for engagement with the spirial threaded plunger assembly.

7. The bar stock feeder assembly for use with a machine tool as set forth in claim 6, wherein:
(a) the retainer is a substantially U-shaped element which fits over the feeder tube assembly and around the feeder seat to hold it in position.

8. The bar stock feeder assembly for use with a machine tool as set forth in claim 6, wherein:
(a) the upright bar tube retaining section includes a bumper adjusting screw assembly which directly engages the bar stock feeder tube retainer to position it in alignment with the machine tool.

9. A bar stock feeder assembly for use with a machine tool, comprising:
a. a bar stock feed tube assembly including an inner tube and a slightly larger outer tube concentric therewith,
b. a pneumatically operated movable plunger assembly disposed within the inner tube for engaging bar stock and moving said bar stock toward the machine tool,
c. a pair of support standard assemblies, one of said assemblies disposed adjacent each end of the feed tube assembly for supporting the feed tube assembly horizontally and in alignment with the machine tool,
d. each of the support standard assemblies having a pedestal base on which a carrier standard is supported,
e. the carrier standard having an upright section disposed above a horizontal support surface of the carrier for holding the bar stock feed tube assembly in alignment with the maching tool,
f. pneumatic supply means connected to the upright section,
g. feed tube assembly locking means including an integral spiral threaded plunger disposed on the upright section for simultaneously locking the feed tube assembly in alignment with the maching tool and connecting it with the pneumatic supply means,
h. horizontal adjusting means disposed transverse of each of said carrier standards on the pedestal base for supporting the carrier standard and providing for its horizontal movement, and
i. vertical adjustment means connected to the standard for providing vertical adjustment of the carrier standard.

10. The bar stock feed assembly for use with a machine tool as set forth in claim 9, wherein:
(a) the horizontal adjusting means includes a horizontally movable adjusting block,
(b) the adjusting block has an activating element integrally connected therewith for incrementally moving the adjusting block in a horizontal direction.

11. The bar stock feed assembly for use with a machine tool as set forth in claim 10, wherein:
(a) the activating element is a rotatable adjusting screw mounted on the pedestal and threadedly engaging the adjusting block to move it horizontally when it is rotated.

12. The bar stock feeder assembly for use with a machine tool as set forth in claims 10 or 11, wherein:
(a) the vertical adjusting means includes a vertical adjusting post having a lower threaded section extending through and engaging the threads of the adjusting block to support the standard and to provide for vertical adjustment of its height.

13. The bar stock feed assembly for use with a machine tool as set forth in claim 9, wherein:
(a) retainer means is integrally connected to the feed tube assembly for positioning it in alignment with the feed tube assembly locking means.

14. The bar stock feeder assembly for use with a machine tool as set forth in claim 13, wherein:

(a) the retainer is a substantially U-shaped element, the open ends of which are supported on the horizontal support surface of the carrier.

15. The bar stock feed assembly for use with a machine tool as set forth in claim 14, wherein:

(a) the bar stock feed tube assembly as an upwardly extending locking and feeder seat which is integrally connected to the retainer and held in upright position, and (b) the feed tube assembly locking means includes a reciprocable spiral threaded plunger with an internal fluid supply conduit which engages the feeder seat.

* * * * *